United States Patent [19]

Sindorf

[11] Patent Number: 4,934,046
[45] Date of Patent: Jun. 19, 1990

[54] METHOD OF ESTABLISHING A HERMETIC SEAL ABOUT A TERMINAL POST OF A BATTERY

[75] Inventor: John F. Sindorf, Pewaukee, Wis.

[73] Assignee: Globe-Union Inc., Milwaukee, Wis.

[21] Appl. No.: 430,717

[22] Filed: Nov. 2, 1989

Related U.S. Application Data

[62] Division of Ser. No. 327,746, Mar. 3, 1989, Pat. No. 4,879,191.

[51] Int. Cl.$^5$ .......................................... H01M 2/30
[52] U.S. Cl. ................................. 29/623.1; 29/623.2; 429/181
[58] Field of Search .......................... 29/623.2, 623.1; 429/178–185

[56] References Cited

U.S. PATENT DOCUMENTS

| | | | |
|---|---|---|---|
| 3,064,068 | 11/1962 | Fouch | 429/180 |
| 3,981,759 | 9/1976 | Summo | 429/180 X |
| 4,495,260 | 1/1985 | Hardigg et al. | 429/180 |
| 4,598,466 | 7/1986 | Arenos et al. | 29/623.2 |

*Primary Examiner*—Anthony Skapars
*Attorney, Agent, or Firm*—Foley & Lardner

[57] ABSTRACT

A method of establishing a hermetic seal about a terminal post of a battery comprises the step of forming a plurality of concentric ridges around the terminal post, positioning a tubular protrusion integral to the cover about the surface region of the terminal post containing the concentric ridges, and applying a radially directed force against the collar of such magnitude to cause the tubular protrusion to flow into intimate contact with the post and the concentric ridges.

6 Claims, 1 Drawing Sheet

U.S. Patent
Jun. 19, 1990
4,934,046
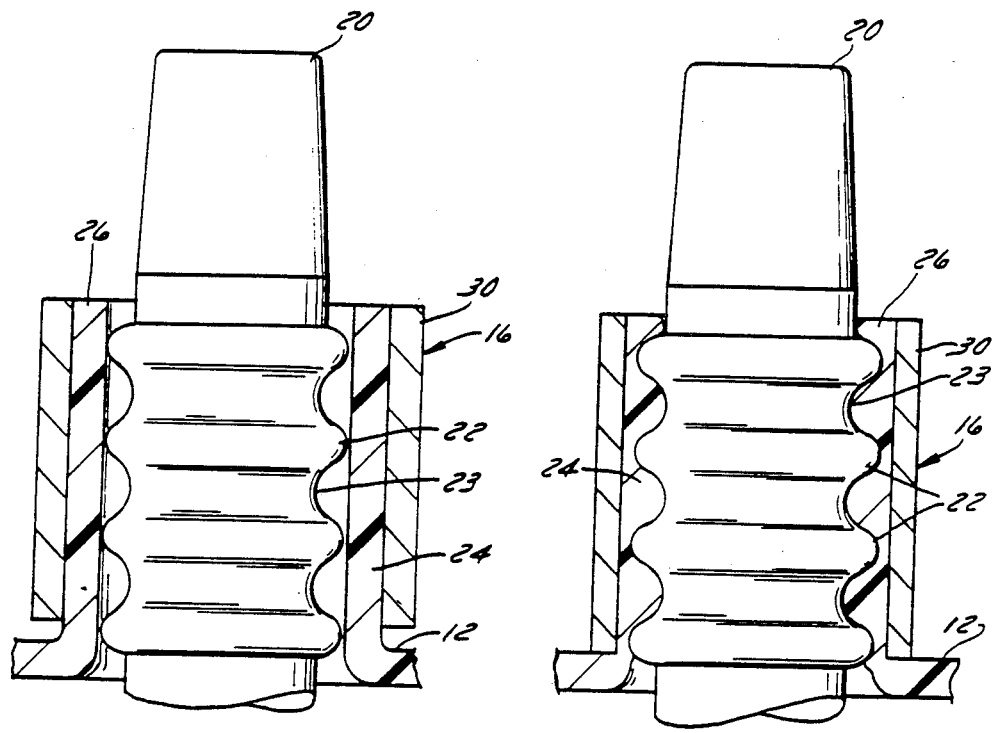
FIG. 3
FIG. 2
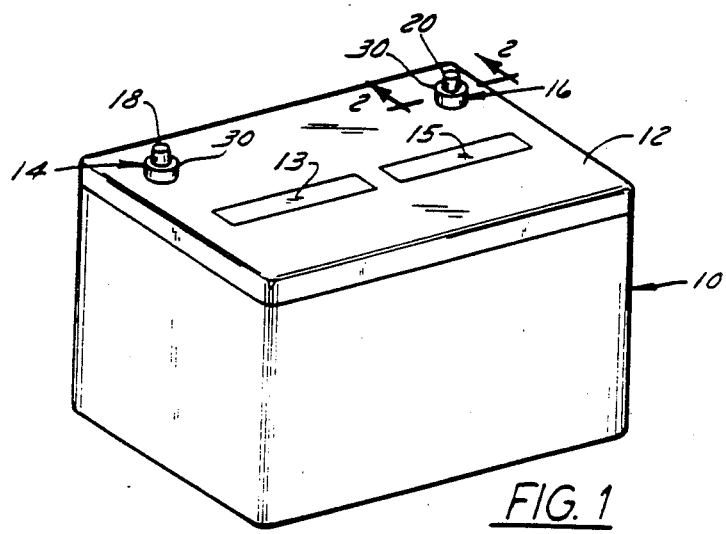
FIG. 1

METHOD OF ESTABLISHING A HERMETIC SEAL ABOUT A TERMINAL POST OF A BATTERY

This is a division application of U.S. filed on Mar. 3, 1989, now U.S. Pat. No. 4,879,191 Ser. No. 07/327,746

BACKGROUND OF THE INVENTION

1. Field of the Invention

This invention relates to electrolytic devices such as batteries, and more particularly, to closure constructions about the terminal posts for such devices.

2. Description of the Prior Art

Electrolytic devices such as batteries ordinarily include a housing serving as containers for internally disposed electrodes disposed electrodes and the electrolyte. A pair of terminal posts generally extend from the electrodes within the container through openings in a cover which is provided as the top surface of the housing. The electrolyte, which is generally a liquid or a paste-like substance, tends to move along the surface of the terminal ports lying between the housing and posts. In order to prevent continued loss of the electrolyte due to leakage and evaporation, the container is preferably sealed and often includes sealing the cover to the casing, and to the terminal posts.

A particular vexatious problem is the electrolyte leakage which occurs in close proximity to the terminal posts. The combination of various factors such as spacing that occurs between posts and covers, the low viscosity of electrolyte, vibration of the battery due to the associated operating equipment and pressure of generated gas within the battery and capillary action of liquids all combine to cause the electrolyte to move upward along the posts. The consequences of such electrolyte leakage are two-fold. First, leakage tends to reduce the working efficiency of a battery. Second, electrolyte leakage, due to the reactivity of the electrolyte constituents, can corrode expensive equipment in close proximity to the battery or the battery itself.

The prior art is replete with examples of various attempts to prevent egress of electrolyte along the terminal posts. Most prior attempts require the use of specialized sealing materials, unusual geometry at the interface of the terminal posts and container cover, or combination thereof. For example, U.S. Pat. No. 4,572,877 issued Feb. 25, 1986 to Botos discloses an hermetic seal for an electrochemical cell. The seal disclosed there includes an electrical insulating material, such as glass, which is fused in the passageway between the terminal and the battery housing in an attempt to prevent electrolyte leakage through the housing opening. While devices such as this generally decrease the amount of electrolyte leakage, the glass or ceramic used often suffers from chemical attack. This in turn leads to the degredation of the seal and subsequent operating effeciency reduction or even failure of the battery. Failure here may be due to the formation of a conductive layer on the glass or to the electrolyte leakage itself.

Another type of seal, commonly employed in alkaline batteries, is a crimp seal. In this type of seal, sealing material is interposed between an upright, cylindrical flange, sometime part flange of the cover itself, and terminal post. A cap seals the battery by fitting over the flange. The sealing material, generally comprises a polymeric material and is utilized to prevent electrolyte leakage. One form of a crimp seal is shown in U.S. Pat. No. 2,665,329 issued Jan. 5, 1954 to Brenner which discloses, in one embodiment, a container which is deformed inwardly by a metallic ring with the container in turn compressing a rubber sealing material against a terminal post.

U.S. Pat. No. 4,559,283 issued Dec. 17, 1985 to Kruger et al. discloses another type of crimp seal that includes a heat recoverable sealing ring. The ring is compressed against the metallic flange of the battery casing which, in turn, compresses a polymeric sealing substance against the terminal post. The heat recoverable sealing ring is disclosed as being able to endure greater compressive forces thus reducing the amount of spring back.

Still another type of seal, disclosed in U.S. Pat. No. 3,051,769 issued Aug. 28, 1962 to J. F. Jammet, comprises a plastic casing having an inward projection at the terminal site pressed against the terminal by use of a zinc rim positioned within the battery cell. The zinc rim provides inward pressure on the inwardly directed flange causing it to bear tightly against the terminal. It is noteworthy that the zinc rim is exposed to corrosive effects of the electrolyte and must be covered with a protective coating material. U.S. Pat. No. 3,433,681 issued Mar. 18, 1969 to J. F. Jammet discloses a similar type design wherein the terminal is provided with grooves which engage the casing and aid in ensuring the tightness of the seal. Additionally, it is necessary to improve the tightness of the seal by coating a layer of wax over the top of the terminal.

SUMMARY OF THE PRESENT INVENTION

In accordance with a preferred embodiment of the present invention, a battery casing, including a top cover, is provided with a protrusion of which is suitably configured, for example, in a tubular configuration to receive a terminal post which extends from the electrodes, or from a strap connecting the electrodes, through the cover. A collar is suitably fabricated from a compressible material into a configuration which circumferentially abuts the cover protrusion. The terminal post is provided with a plurality of separated ridges and recesses which substantially circumscribe the terminal post along the region immediately adjacent the protrusion from the cover, the class of fit of the protrusion on the terminal post being a "medium running fit" to "loose running fit" (as classified in *Marks' Standard Handbook for Mechanical Engineers*, pages 8–48, ninth edition). The collar is radially compressed against the cover causing the cover protrusion to flow into the recesses of the terminal post thereby forming a hermetic seal.

BRIEF DESCRIPTION OF THE DRAWINGS

A preferred exemplary embodiment of the present invention will hereinafter be described wherein like numerals denote like elements and:

FIG. 1 is a prospective view of a battery depicting generally a seal arrangement in accordance with the present invention.

FIG. 2 is a cross-sectional view taken along lines 2—2 of FIG. 1.

FIG. 3 is a cross-sectional view of the terminal post of a battery and components of seal shown in spaced relationship prior to crimping about the post.

DETAILED DESCRIPTION OF THE PREFERRED EMBODIMENT

It is not necessary for the purpose of the present invention to describe the various internal components of a battery but provide only a brief and general discussion of the environment in which the present invention is employed. Secondary batteries of the lead oxide-acid type, for example, have sealed casings containing separated cells. In each cell are positioned positive and negative electrodes generally separated by a member called a separator. Each cell is provided with sufficient liquid electrolyte to carry out the desire electrolyte reaction. The positive and negative terminal ports are electrically connected to respective positive and negative electrodes of the various cells.

The problem of electrolyte creeping up the terminal posts is prevalent in secondary batteries having liquid, gelled or supported electrolytes. The wetting and corrosive characteristics of the electrolyte have continued to be a vexatious problem not satisfactorily addressed by the prior art.

To demonstrate how applicant has provided a simple but effective solution to the aforementioned problem, reference is now made to FIG. 1 which simply depicts a battery 10 having a rectangular shaped casing provided with a flat top or cover 12. A pair of terminal posts 18 and 20 which interface with an extend through a top 12. Terminal posts 18 and 20 each are provided with a seal shown generally by reference numerals 14 and 16. Removable strips 13 and 15 shown in a co-planar arrangement with top 12 provide access to the various cell compartments within battery for checking the level of electrolyte and the like.

FIG. 2 depicts seal 16 and its various elements about port 20 in a normal working relationship while FIG. 3 illustrates the relationship of the various elements of seal 16 and post 20 prior to compressing being applied to establish the desired sealing relationship. As shown in FIG. 2, terminal post 20 is provided with a plurality of annular concentric ridges 22 and corresponding recesses 23. Ridges 22 and recesses 23 substantially circumscribe terminal post 20 along the region of the terminal post 20 which extends upwardly beyond cover 13. The pitch of ridges 22 is dependent on the diameter of the post 20 and the wall thickness of protrusion 24. Typically the pitch of ridges 22 for a $\frac{3}{8}''$ diameter post 20 is about 1/16 inch while the height thereof measured along a line perpendicular to an extending from a plane coinciding with the bottom point of recesses 23 is typically about 0.02 inch.

It is important to note, however, ridges 22 and recesses 23 are not formed in the shape of threads, i.e., there is not path connecting one recess 23 to another, or one ridge 22 to another. As will be discussed below, this tends to prevent any openings occurring along the terminal post which would otherwise provide passageways for electrolyte. Referring again to FIG. 3, cover 12 is provided with a pair of integral tubular protrusions 24 adapted to receive terminal posts 18 and 20. For clarity, the features of the present invention will only be described with respect to terminal post 20. It should be appreciated that these features are likewise intended to be provided with respect to terminal post 18.

Tubular protrusion 24 extends generally upwardly from the upper surface of cover 12 with the top portion 26 thereof positioned above the region of post 20 carrying ridges 22. The entire inner circumference of protrusion 24 abuts or is in close proximity to the body of terminal post 20. Typically, for use with ridges of 1/16 inch pitch, it has been found desireable to have the wall thickness of protrusion between about 0.06 to 0.10 inch thick. It is preferred that protrusion 24 have a medium running fit to a loose running fit with post 20.

An annularly shaped collar 30 having a diameter slightly larger than that of tubular protrusion 24 is placed over the protrusions in essentially a locational clearance fit to a loose running fit relationship therewith. Collar 30 is typically shaped like a short length of thin wall pipe, but may be any desired configuration as long as the interior annular surface thereof substantially abuts the entire circumferential area of the tubular protrusion 23 in the region of ridges 22 and recesses 23 on post 20. Additionally, it is desirable that the tops of collar 30 and protrusion 24 lie in approximately the same plane. Protrusion 24, however, may protrude or be recessed slightly without affecting the seal quality.

Once in place about tubular protrusion 24, collar 30 is reduced in diameter by radially compressing it against tubular protrusion 24 with sufficient force such that tubular protrusion 24 is caused to contact ridges 22 and fill the recesses 23 of terminal post 20. The radial compressive force applied to collar 30 exceeds the compressive strength of the materials of which both the collar 30 and the tubular protrusion 24 are comprised. This radial compression of collar 30 (reductions of diameters) may be accomplished through use of a split die and a hydraulically operated cylinder. The required compression or crimping force is dependent on the collar material, wall thickness, and diameters. Typically, to suitably crimp a collar for a $\frac{3}{8}''$ diameter post a force of 7500 lbs. acting on a split die is sufficient to cause intimate contact to occur between a portion of battery cover 12 and battery terminals 20 and 18. Moreover, the compressive force is sufficient to cause the material of tubular protrusion 24 to flow freely into the area of recesses 23. Other compression techniques may be employed such as, for example, placement of a collar about protrusion 24 in an expanded condition and allowing it to shrink, thus compressing protrusion 24 into the terminal post.

The crimp terminal seal of the present invention provides a hermatic seal which prevents the electrolyte from egressing up the terminal post 20 and out of the battery casing. The high compressive force applied to collar 30 which in turn causes the material of cover 12 in the area of tubular protrusion 24 to flow into the recesses 23 about ridges 22 is continually maintained due to the now reduced inside diameter of collar 30. Moreover, ridges 22 and recesses 23 being separated and distinct annular rings about terminal post 20 and not continuous in the sense of threads, inhibit possible electrolyte leakage and wicking of the electrolyte up the terminal posts and out of the battery case by maximizing the path tortuosity. As a result, the external portion of the posts and clamps stay dry and corrosion is reduced or eliminated.

Real time tests of elastomer seals went a maximum of 15 months before showing evidence of leaking whereas the crimp terminal seal being disclosed has shown no evidence of leakage from the onset of testing; continuing past 36 months. A method of accelerated testing proposed by E. J. McHenry and P. Hubbauer real time tests and accerated time tests as described in the article entitled "*Hermetic Compression Seals For Alkaline Batteries*" published in the May, 1962 issue of *Electrochemi-*

*cal Science and Technology,* has shown the elastomer seals to fail in about 67 days whereas the crimp seal showed no evidence of leaking after 540 days of continuous testing.

The battery of the present invention therefore provides a seal of simple construction superior to those heretofore known. Tubular protrusion 24 may be injection molded as part of cover 12, or added and heat sealed to conventional flat top covers. Similarly, terminal 20 with ridges 22 and recesses 23 may be formed from a conventional smooth surface terminal post, or formed with such features at the outset. In either case, the cost of preparing the seal of the present invention is reduced.

It will be understood that the foregoing description is of a preferred embodiment that is exemplary of the present invention and that the invention is not limited to the specific form shown. Modifications may be made in design and arrangement thereof within the scope of the present invention, as expressed in the appended claims.

I claim:

1. A method of establishing a hermetic seal about a terminal post extending through a cover of a battery comprising the steps of:
   (a) forming a plurality of concentric ridges around said terminal post along one surface region thereof;
   (b) forming a tubular protrusion in said cover;
   (c) positioning said protrusion around and closely juxtaposed to said one region of said terminal post;
   (d) positioning a compressible collar around said protrusion; and
   (e) applying a radially directed compressive force to said collar which force has sufficient magnitude to reduce the diameter of said collar and to cause the tubular protrusion material to flow into intimate contact with said post along said one surface region thereof.

2. The method of claim 1 in which said tubular protrusion is made from a material having a flow characteristic of thermoplastics.

3. The method of claim 2 in which said material is a thermoplastic selected from a group consisting of polyomids, polyolefins, polyvinylchloride.

4. The method of claim 2 in which said collar provides a maintenance compressive force exceeding the yield strength of said tubular protrusion material after said collar diameter has been reduced.

5. The method of claim 4 in which said collar material has a characteristics sufficiently low to sustain said maintenance force.

6. The method of claim 5 in which said ring is made of a material selected from a group consisting of low carbon stainless steel and low carbon mild steel.

* * * * *